Jan. 3, 1967
A. H. WEHE, JR., ETAL  3,296,286
PRODUCTION OF CARBOXYLIC ACIDS
Filed Sept. 10, 1963
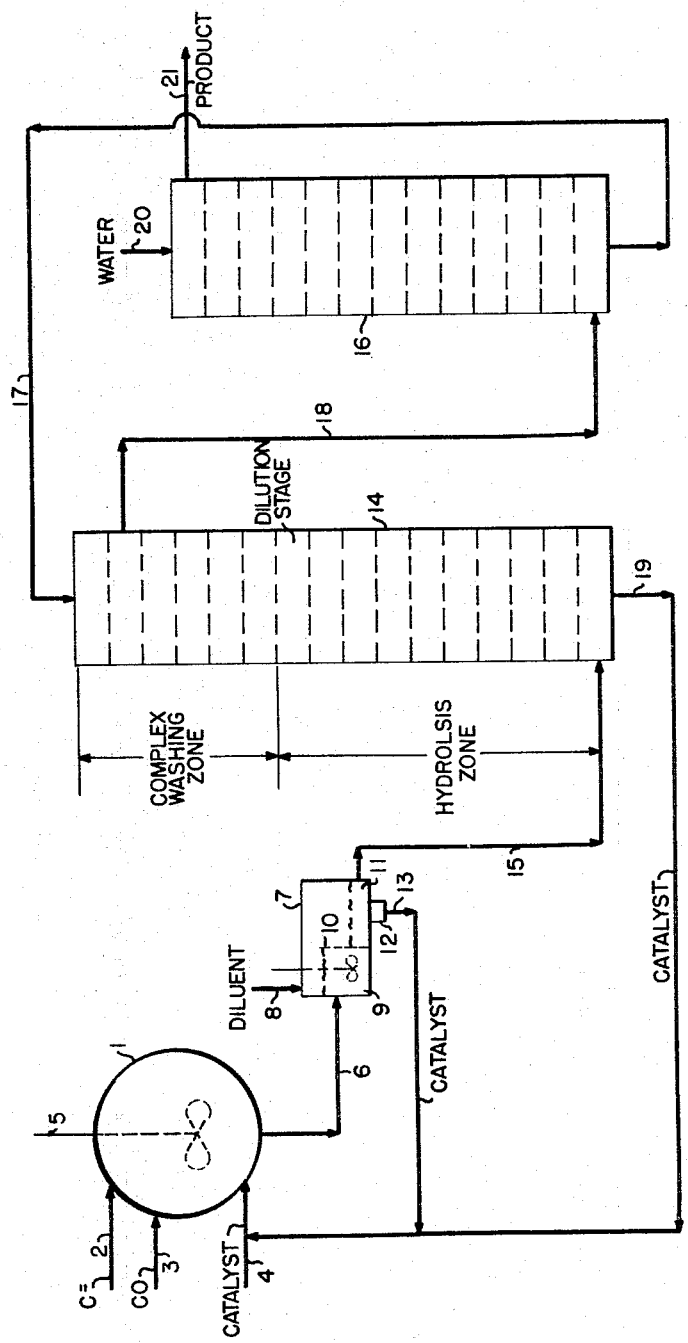
Albert Henry Wehe, Jr.
Henry George Ellert
Raymond Carroll Lohman
Worthy Truman Boyd
Inventors
By C. B. Barris  Patent Attorney

United States Patent Office 3,296,286
Patented Jan. 3, 1967

3,296,286
PRODUCTION OF CARBOXYLIC ACIDS
Albert Henry Wehe, Jr., Henry George Ellert, Raymond Carroll Lohman, and Worthy Truman Boyd, all of Baton Rouge, La., assignors to Esso Research and Engineering Company, a corporation of Delaware
Filed Sept. 10, 1963, Ser. No. 307,856
7 Claims. (Cl. 260—413)

This invention relates to the production of carboxylic acids. More particularly, the invention relates to an improved two-step process for reacting olefins with carbon monoxide and water in the presence of mineral acid catalysts to produce aliphatic carboxylic acids.

The production of carboxylic acids from olefins, carbon monoxide and water in the presence of a variety of acidic catalysts is well known. One method for producing the desired carboxylic acids, for example, constitutes what can be considered a two-step synthesis process involving the reaction of water, carbon monoxide and olefins using a highly acid, inorganic acid catalyst such as hydrated boron fluoride. The basic reaction of such process involves the combination of one mole of olefinic feedstock with one mole of water and one mole of carbon monoxide to provide the carboxylic acid product having one more carbon atom than the olefin feedstock. In carrying out this process in two steps, the first step involves reaction of the olefinic compound with carbon monoxide and the hydrated boron fluoride catalyst in the absence of any added water. An exothermic reaction occurs with the formation of what may be called a complex of the hydrated boron fluoride catalyst, the carbon monoxide, and the olefin compound. In the second step of the two-step process, it is then necessary to hydrolyze this complex using about one mole of water per mole of carbon monoxide complexed. While greater amounts of water may be employed, this is unnecessary and would necessitate reconcentration of the diluted boron fluoride catalyst obtained. It is with this second step of the two-step process that the present invention is specifically concerned.

While the above-mentioned two-step process is fundamentally attractive, the full commercial potential of producing carboxylic acids from these relatively inexpensive reactants has not generally been realized because of certain disadvantages attending the processes heretofore proposed. For example, it has been discovered that if the stoichiometric molar quantity of water is all added to the complex in a single hydrolysis stage, it is not possible to recover all of the boron fluoride catalyst; only about 90–95% of the acid can be recovered using said single hydrolysis stage. It has been found that in a single hydrolysis stage, highly localized concentrations of water tend to dilute the liberated boron fluoride catalyst rather than to hydrolyze the complex, so that incomplete hydrolysis occurs and relatively poor water utilization results. Again when synthesizing carboxylic acids having more than about 7 carbon atoms, the boron fluoride catalyst is partially soluble in the carboxylic acid product so that complete catalyst recovery cannot be achieved in a single hydrolysis stage. It has been found too that even when employing a plurality of hydrolysis stages, if sufficient excess of water is added to the complex hydrolysis zone, solid boric acid will precipitate. On the other hand, if insufficient water is added to the hydrolysis zone, some of the complex will not be converted in said hydrolyis zone and solid boric acid will precipitate in the washing zone which follows. Precipitation of solid boric acid in the hydrolysis equipment plugs such equipment and eventually makes it inoperative thus causing costly shutdowns for repair. Furthermore, hydrolysis in a series of conventional mixer-settler vessels requires high initial investment and in addition presents difficulties in precise control of water to each stage employed.

It is an object of the present invention therefore to provide an improved process which attains complete recovery of the catalyst without the deleterious precipitation of solid boric acid in either the complex hydrolysis zone or in the acid washing zone. Other objects will appear hereinafter.

Broadly, the above objects are accomplished by synthesizing the carboxylic acid by a first step formation of a complex of carbon monoxide, an olefinic compound, and a hydrated boron fluoride catalyst and by a second step hydrolysis of the complex, the improvement residing in the technique of hydrolyzing the complex in a continuous multi-staged hydrolysis step. According to the present invention, this multi-stage hydrolysis step comprises at least three, but preferably more than three, discrete stages. In a first of these stages the complex is hydrolyzed with aqueous hydrolysis medium into a mixture of crude carboxylic acid product and dilute boron catalyst having a water to $BF_3$ mole ratio of less than about 3.0 to 1. In another of said discrete stages, other than the first stage and the last stage, it is critical that the mixture of crude carboxylic acid product and boron catalyst is diluted with $BF_3$-containing aqueous medium having a water to $BF_3$ mole ratio of greater than 15 to 1 into a crude carboxylic acid product and a reconstituted boron catalyst having a maximum water to $BF_3$ mole ratio of about 3.0 to 1. In the latter stage, or stages, the crude carboxylic acid product is washed with said $BF_3$-containing aqueous medium and said stage, or stages, are maintained at a water to $BF_3$ mole ratio of greater than 15 to 1.

The process of this invention may be used for the preparation of carboxylic acids from any mono-olefinic compound containing 3–20 carbon atoms. The olefin feedstock can comprise straight or branched chain alkenes including propylene, butylene, pentene, and the higher homologues and isomers of these alkenes. The olefins of this class can constitute either terminal or internal unsaturated alkenes. Similarly, cyclic olefins having up to 20 carbon atoms may be employed as the feedstack, including cyclopentene, cyclohexene, and the higher homologues. Any desired mixtures of these compounds such as the $C_4$ fraction recovered in petroleum refining operations may be used if desired. All of these mono-olefinic compounds can include functional groups such as carboxylic acid, ester, or alcohol groups.

The preferred catalyst for use in the process of this invention is a hydrated boron fluoride catalyst having the empirical formula:

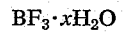

$$BF_3 \cdot xH_2O$$

where $x$ equals about 2 to 2.5. Such catalysts involve the combination or complexing of boron fluoride with water so as to form definite chemical compounds including those corresponding to the empirical formula of boron fluoride monohydrate and boron fluoride dihydrate, and which may include additional quantities of water which may be present as a solvent, or may complex or otherwise react with the boron fluoride in other ratios. Such catalysts are referred to herein as "hydrated boron fluoride catalysts." While different quantities of water may be employed in such catalysts, it is particularly preferred in the practice of this invention to use a boron fluoride catalyst containing about 2 to 2.5 moles of water per mole of boron fluoride, and particularly a catalyst containing about 2 moles of water per mole of boron fluoride. Greater water contents may be used, but are not required and would involve additional process complexities to permit recovery or reconstitution of the desired catalyst. Much lower water contents are impractical since the hydrated boron fluoride catalyst cannot be recovered in the hydrolysis system of this invention unless combined with about 1.7 to 2 or slightly more moles of water.

Optionally, however, the hydrated boron fluoride catalyst may be used in combination with other inorganic acid catalysts. Sulfuric acid or phosphoric acid in particular may usefully be employed with the hydrated boron fluoride catalyst. The relative proportions of the acids employed may be varied, although use of approximately equal molar amounts of boron fluoride and phosphoric acid or sulfuric acid is preferred.

The acid synthesis step may be conducted at temperatures within the range of about $-20°$ C. up to $150°$ C., although the preferred temperature is in the range of $20-100°$ C. Elevated pressures are required in order to maintain a high carbon monoxide partial pressure. Pressures of 10 to 600 atmospheres or more can be employed, although it is preferred to use a pressure of about 40 to 100 atmospheres.

The process may be conducted in either a semi-batch or continuous fashion. In a semi-batch process, the liquid, inorganic acid catalyst is first introduced to a suitable reactor or autoclave and thereafter carbon monoxide and olefin are introduced to the reactor continuously until the catalyst is exhausted. In continuous processing, a similar reactor and procedure can be employed, but with the continuous withdrawal of reactant products and the continuous introduction of fresh or recycle catalyst.

Broadly, the hydrolysis step consists of hydrolyzing the complex in a hydrolysis zone so as to form the crude carboxylic acid product and subsequently washing said crude carboxylic acid product in an acid washing zone wherein both of said zones comprise a plurality of continuous countercurrent mixing-settling stages. In these stages $BF_3$-water concentrations are maintained so as to avoid the concentrations of $BF_3$ in water where solid boric acid precipitates. In general, the hydrolysis step may be conducted at temperatures within the range of about 30 up to about $100°$ C., with the preferred temperature range being from 45 to $80°$ C. Elevated pressures may be employed although such use is not required.

The invention, as well as its many advantages, will be further understood by reference to the following detailed description and drawings in which:

FIGURE 1 diagrammatically illustrates a flow plan of the complete synthesis process.

Referring to FIGURE 1, the numeral 1 identifies the first step reactor into which olefin is supplied through line 2, carbon monoxide through line 3, and the hydrated boron fluoride catalyst through line 4. The reactor, preferably a spherical vessel, is equipped with a stirring means 5 so as to thoroughly agitate the reactor and to maintain a homogeneous mixture.

The reaction of olefin, carbon monoxide, and catalyst in reactor 1 is carried out at a temperature in the range of $-20$ to $150°$ C. under a carbon monoxide pressure of about 10–600 atmospheres. It is preferred to use long reaction periods of about 1–4 hours so as to attain maximum conversion of the olefin feed to the complex with carbon monoxide and the boron fluoride catalyst. It is believed that the nature of the complex is such that the complex exists as a homogeneous liquid either containing precursors of the final carboxylic acid product or holding the carboxylic acid product in some type of complex formation with the boron fluoride. The reaction described to form this complex is carried out with about 0.5 to 1.5 moles of the catalyst per mole of olefin feed. Preferably, a substantial excess of catalyst is maintained over that which is tied up in a complex with the olefin.

In accordance with this invention, the complex described is subjected to the treating steps illustrated in the drawing. In the first step of the process, the reactor products are removed from reactor 1 through line 6 and are mixed with a hydrocarbon diluent to permit separation of excess catalyst from the complex formed in the reaction. This can be accomplished using a simple orifice mixer, with a subsequent settling tank. Alternately, as illustrated in FIGURE 1, the hydrocarbon diluent can be mixed with the reactor products in a mixing and settling tank 7. Naphtha or other hydrocarbon diluent such as low molecular weight, normally liquid, non-reactive paraffins may be introduced to vessel 7 through line 8 for admixture with the reactor products in agitated zone 9. Preferably about 15–20 vol. percent of the hydrocarbon diluent is employed, although any desired amount may be used. This mixture can then overflow the weir 10 into the settling zone 11 to permit separation of a lower catalyst phase 12 having an interface in the sump portion of the mixer-settler tank. The separated catalyst may be withdrawn through line 13 for recycle and reuse in reactor 1.

In accordance with this invention, the complex, after separation of excess acid as described, is subjected to a hydrolysis treatment in a multi-staged hydrolysis step. Such hydrolysis treatment is suitably effected in a continuous countercurrent vertical hydrolysis tower 14. In the application of the instant invention to said tower, conditions are maintained as such that the tower is divided into what may be referred to as phases or zones, i.e., a first hydrolysis, that is, a "complex hydrolysis" zone wherein the catalyst phase is continuous and the complex is dispersed and a second complex washing or "acid washing" zone wherein the acid phase is continuous and the water is dispersed. In practice the complex hydrolysis zone is characterized as being generally dark in color and the acid washing zone as light in color. As hereinbefore mentioned, the tower in which the hydrolysis step is effected contains a plurality of discrete mixer-settler stages; thus each of said complex hydrolysis and acid washing zones contain one or more stages, the number of such stages depending on a variety of variables employed in the process, e.g., throughput, temperature, etc. As employed herein the term "stage," while describing a discrete mixing-settling stage is not to be limited to one where equilibrium is necessarily reached and therefore is not to be limited to an "ideal" or "theoretical" stage. It is found, however, that relative to the conditions employed herein, that a minimum of 3 stages are contained in tower 14, with a range of 3 to 16 stages being found as suitable and with 16 stages being the preferred number. Of this number of stages, one or more stages will comprise hydrolysis stages in the complex hydrolysis zone; one will consist of what is referred herein as the "dilution stage" of the hydrolysis zone and one or more will comprise washing stages in the acid washing zone. Holding times in each of said stages are from 5 to as long as 120 minutes so as to achieve complete mixing and settling.

The hydrolysis tower 14 is operated at temperatures in the range of 30 to $100°$ C., and preferably in the range of 45 to $80°$ C. If desired, cooling coils may be provided in the hydrolysis zone of the tower to remove the heat of reaction resulting from same. While packing may be provided in the acid washing zone, i.e., the upper stages of the tower, so as to aid in settling, packing is not desirable in the hydrolysis zone thereby making the tower less susceptible to plugging in the event of solid boric acid formation during an upset.

In the process of the present invention the complex is fed to a catalyst-rich first hydrolysis stage at the bottom of hydrolysis tower 14 via line 15, and water, i.e., the condensate from water wash tower 16 is fed to the top of tower 14 via line 17. The bottom portion of the tower (for example, the bottom 10 stages in a 16-stage tower) is used primarily for the staged hydrolysis of the complex. As mentioned, in this zone of the hydrolysis tower the catalyst phase is continuous and the complex is dispersed. The complex, being less dense than the catalyst, rises through the catalyst in such zone of the tower and is hydrolyzed by intimate contact with the catalyst which has been somewhat diluted by condensate water from above. Thus, in this zone, the complex reacts with a stoichiometric quantity of water to form the carboxylic acid product and release the hydrated $BF_3$ catalyst. At the last hydrolysis stage of the hydrolysis zone of the tower the mole ratio of water to $BF_3$ contained in said stage does not exceed 3.0 to 1 and is generally from about 2.0 to 3.0 to 1.

From the last stage of the hydrolysis zone the substantially hydrolyzed acid containing some $BF_3$ rises in the tower into the separate equilibrated dilution stage of said hydrolysis zone. Into said dilution stage, condensate water containing $BF_3$ in an amount such that the $H_2O$ to $BF_3$ mole ratio is greater than 15 to 1 settles from above and is intimately mixed with the risen catalyst and acid components contained therein. The mixture is maintained in this discrete stage for a sufficient time so that the mole ratio of water to $BF_3$ contained in this stage is about 3.0 to 1 or less.

The hydrolyzed crude carboxylic acid, still containing some $BF_3$, continues its rise in the hydrolysis tower and enters the remaining upper stages of the tower, that is, what is referred to as the acid washing zone. Here the acid is washed by the condensate water which has, as hereinbefore mentioned, been fed to the top of the hydrolysis tower via line 17. In this portion of the tower, the acid phase is continuous and the water is dispersed. The washed crude carboxylic acid product is withdrawn from the top of the hydrolysis tower through line 18 and catalyst is withdrawn from the bottom of said tower through line 19 and may be recycled and returned to reactor 1.

As can be realized, the quantity of condensate water added to the hydrolysis tower is critical to the instant invention. If too much water is added, the recovered catalyst will become diluted. Moreover, if sufficient excess water is added to the hydrolysis zone in the tower so as to increase the water content of the catalyst in excess of $BF_3 \cdot 3 H_2O$, but less than $BF \cdot 15 H_2O$, then solid boric acid will precipitate. Conversely, if insufficient water is added to said hydrolysis zone, some of the complex will not be converted in said hydrolysis zone and solid boric acid will precipitate later in the acid washing zone. It is preferred therefore to provide specific gravity instruments so as to monitor the mole ratio of water to $BF_3$ and thus control the water addition rate. Experience has shown that the specific gravities which can be tolerated in the various portions of the hydrolysis tower without precipitation of boric acid are as follows:

| Zone | Mole Ratio $H_2O/BF_3$ | Specific Gravity at 24° C. |
| --- | --- | --- |
| Hydrolysis: | | |
| (a) Hydrolysis Stages | <3.0 to 1 | >1.49. |
| (b) Dilution Stage | ~3.0 to 1 or less | ~1.49 or more. |
| Acid Washing | >15.0 | <1.15. |

Of course, filters are preferably provided at suitable locations in the hydrolysis tower to remove traces of solid boric acid which might be formed during upsets. Similarly, provision may be made to recycle catalyst from either the bottom of the tower or elsewhere in the system to the hydrolysis zone of said tower. This procedure makes it possible to quickly adjust the water–$BF_3$ mole ratio of the catalyst into the desired range of less than about 2.5 to 1 if it should become too dilute.

The partially washed crude carboxylic acid flows from the top of hydrolysis tower 14 into the bottom of the water wash tower 16 via line 18 where the remaining traces of the boron fluoride catalyst are removed. Preferably steam condensate is used as the wash water. Any desired water washing arrangement may be used for this purpose, although provision should be made for at least about 10 contacting stages. As illustrated in FIGURE 1, this can be carried out in a vertical water washing tower 16 in which water is introduced at the top through line 20 for countercurrent gravity flow with the crude carboxylic acid introduced at the bottom of the tower. Tower 16 may be provided with packing material and can be provided with agitators in areas between the separated packing for effective countercurrent multi-stage contacting. The washed carboxylic acid product may then be removed from the tower through line 21. This product of the process may then be subjected to fractionation or other desired purification and finishing stages.

The water removed from the bottom of tower 16 through line 17 will contain recovered boron fluoride catalyst. This water is therefore used to supply the hydrolysis needs of the hydrolysis tower 14, insuring complete retention of all boron fluoride catalyst in the system described.

As indicated, in a balanced operation, at least one mole of water must be introduced through line 20 and subsequently used in the hydrolysis steps of the process for each mole of carboxylic acid product. Distribution of the amount of water throughout the acid washing, the dilution, and the hydrolysis stages is, however, particularly critical and must be supplied to each of the stages as hereinbefore described.

The advantages offered by the process will be more fully appreciated from the following examples which are included for illustration and not for limitation of the evaluation.

*Example 1*

In an experiment conducted to demonstrate the operability of the hydrolysis system illustrated in FIGURE 1 of the drawings, a complex was formed with propylene trimer, carbon monoxide and $BF_3 \cdot 2 H_2O$ catalyst. The reactor effluent of the complex formation step was then diluted with about 15 volume percent of normal hexane, and unreacted excess $BF_3 \cdot 2 H_2O$ catalyst was settled and removed. The remaining complex was then hydrolyzed in stages at a tower temperature of about 75° C. using water that had been used to wash an equivalent amount of crude acid resulting from such hydrolysis. Thus the water of hydrolysis used had been obtained by contacting crude carboxylic acid in equilibrium stages. Small amounts of solid boric acid were carried over with the $C_{10}$ organic acid product. There was no evidence of solid boric acid formation in the column itself. The washed organic acid had a pH of 4 indicating good washing.

The regenerated catalyst had a density of 1.61 at 27° C. The recovered acid was found suitable for recycle to the synthesis stage with apparently the same activity and selectivity as fresh $BF_3 \cdot 2 H_2O$ catalyst.

What is claimed is:

1. In a process for synthesizing carboxylic acids by a first-step formation of a complex of carbon monoxide, an olefinic compound selected from the group consisting of unsubstituted and carboxyl, ester and hydroxy substituted compounds and a hydrated boron fluoride catalyst and a second-step hydrolysis of said complex, the improvement which comprises continuously introducing the complex into at least one discrete hydrolysis stage, hydrolyzing said complex therein with aqueous hydrolysis medium into a crude carboxylic acid product and a reconstituted boron catalyst having a water to $BF_3$ mole ratio of less than 3.0 to 1, introducing the resulting acid product-catalyst mixture into another discrete stage, diluting said acid product-catalyst mixture with a $BF_3$-containing aqueous medium having a water to $BF_3$ mole ratio of greater than 15 to 1 while maintaining said stage in equilibrium and at a water to $BF_3$ mole ratio of about, but less than, 3.0 to 1, introducing the resulting acid product-catalyst mixture into at least one other discrete stage, and washing said acid product-catalyst mixture with aqueous medium while maintaining said stage at a water to $BF_3$ mole ratio of greater than 15 to 1.

2. The process of claim 1 in which prior to hydrolysis, the complex is separated from excess catalyst by admixing with up to about 25 volume percent of a liquid, non-reactive hydrocarbon diluent.

3. In a process for synthesizing carboxylic acids by a first-step formation of a complex of carbon monoxide, an olefinic compound selected from the group consisting of unsubstituted and carboxyl, ester and hydroxy substituted compounds and a hydrated boron fluoride catalyst and a second-step hydrolysis of the said complex, the improvement which comprises continuously hydrolyzing said complex in a hydrolysis tower having a minimum of 3 discrete mixing-settling stages wherein one of said stages said complex is hydrolyzed with aqueous hydrolysis medium into crude carboxylic acid product and dilute boron catalyst having a water to $BF_3$ mole ratio of less than about 3.0 to 1, wherein one of said stages, other than a first stage and a last stage, and subsequent to a hydrolysis stage, said crude carboxylic acid product and a reconstituted boron catalyst having a water to $BF_3$ mole ratio of less than about 3.0 to 1 is diluted with aqueous medium having a water to $BF_3$ mole ratio of greater than 15 to 1 into a crude carboxylic acid product and a more dilute reconstituted boron catalyst having a water to $BF_3$ mole ratio of about, but less than, 3.0 to 1, and wherein the crude carboxylic acid product is, in at least one stage subsequent to said dilution stage, washed with aqueous medium having a water to $BF_3$ mole ratio of greater than 15 to 1.

4. In a process for synthesizing carboxylic acids by first-step formation of a complex of carbon monoxide, an olefinic compound selected from the group consisting of unsubstituted and carboxyl, ester and hydroxy substituted compounds, and a hydrated boron fluoride catalyst and a second-step hydrolysis of the said complex, the improvement which comprises hydrolyzing said complex in a hydrolysis zone comprising a plurality of discrete stages, a first portion of said hydrolysis zone consisting of at least one discrete stage wherein said complex is hydrolyzed with aqueous hydrolysis medium into a mixture of crude carboxylic acid product and reconstituted boron catalyst having a water to $BF_3$ mole ratio of less than 3.0 to 1, a second portion of said hydrolysis stages consisting of a single discrete, equilibrated stage wherein said acid product-catalyst mixture is diluted with aqueous hydrolysis medium containing $BF_3$ in a water to $BF_3$ mole ratio of greater than 15 to 1 into a crude carboxylic acid product and reconstituted boron catalyst having a water to $BF_3$ mole ratio of about, but less than, 3.0 to 1, and subsequently introducing the diluted crude carboxylic acid product-boron catalyst mixture from the one discrete equilibrated dilution stage into a washing zone comprising a plurality of discrete stages wherein said acid product-catalyst mixture is further diluted and washed with aqueous hydrolysis medium into crude carboxylic acid product and boron catalyst having a water to $BF_3$ mole ratio greater than 15 to 1 and recovering said crude carboxylic acid product and the resulting dilute boron fluoride catalyst.

5. In a process for synthesizing carboxylic acids by a first-step formation of a complex of carbon monoxide, a $C_3$–$C_{20}$ olefin, and a hydrated boron fluoride catalyst and a second-step hydrolysis of the acid complex, the improvement which comprises continuously hydrolyzing said complex in 16 discrete mixer-settler stages, a first portion of said stages comprising 9 discrete stages wherein said complex is hydrolyzed with a countercurrent flow of aqueous hydrolysis medium into crude carboxylic acid product and reconstituted boron catalyst having a water to $BF_3$ mole ratio of less than about 3.0 to 1, a second portion of said stages consisting of a single discrete, equilibrated stage wherein said acid product and catalyst are diluted with said countercurrent flow of aqueous hydrolysis medium containing $BF_3$ in a water to $BF_3$ ratio of greater than 15 to 1 into crude carboxylic acid product and reconstituted boron catalyst having a water to $BF_3$ mole ratio of about, but less than, 3.0 to 1, and a third portion of said stages consisting of 6 discrete stages wherein said acid product and catalyst are washed and further diluted with said countercurrent flow of $BF_3$ containing aqueous hydrolysis medium into crude carboxylic acid product and reconstituted boron catalyst having a water to $BF_3$ mole ratio of greater than 15 to 1 and recovering said carboxylic acid product and the resulting dilute boron fluoride catalyst.

6. The process of claim 5 in which the hydrolysis tower is operated at temperature of from 30 to 100° C.

7. The process of claim 5 in which holding times of from 5 to 120 minutes are employed in each of said stages.

References Cited by the Examiner
UNITED STATES PATENTS

| | | | |
|---|---|---|---|
| 2,135,459 | 11/1938 | Loder | 260—533 |
| 3,068,256 | 12/1962 | Roming | 260—413 |

CHARLES B. PARKER, *Primary Examiner.*

A. H. SUTTO, *Assistant Examiner.*